US007699260B2

(12) United States Patent
Hughey

(10) Patent No.: US 7,699,260 B2
(45) Date of Patent: Apr. 20, 2010

(54) VERTICAL TAKEOFF AND LANDING AIRCRAFT USING A REDUNDANT ARRAY OF INDEPENDENT ROTORS

(75) Inventor: Bradley Ward Hughey, Lake In The Hills, IL (US)

(73) Assignee: Hughey Electricopter Corporation, Lake In The Hills, IL (US)

( * ) Notice: Subject to any disclaimer, the term of this patent is extended or adjusted under 35 U.S.C. 154(b) by 379 days.

(21) Appl. No.: 11/325,159

(22) Filed: Jan. 4, 2006

(65) Prior Publication Data

US 2006/0266881 A1 Nov. 30, 2006

Related U.S. Application Data

(60) Provisional application No. 60/644,098, filed on Jan. 14, 2005.

(51) Int. Cl.
*B64C 27/08* (2006.01)
(52) U.S. Cl. .................... 244/17.23; 244/39; 244/17.11
(58) Field of Classification Search ............. 244/17.11, 244/17.23, 17.25, 39, 56
See application file for complete search history.

(56) References Cited

U.S. PATENT DOCUMENTS

| | | | | |
|---|---|---|---|---|
| 2,327,145 A | | 8/1943 | Van Gieson | |
| 2,330,204 A | * | 9/1943 | Campbell | 244/17.23 |
| 2,540,404 A | * | 2/1951 | Neale | 244/17.11 |
| 2,651,480 A | | 9/1953 | Pullin | |
| 3,002,712 A | * | 10/1961 | Beckwith | 244/17.23 |
| 3,081,964 A | * | 3/1963 | Quenzler | 244/7 R |
| 3,185,410 A | | 5/1965 | Smart | |
| 3,253,806 A | * | 5/1966 | Eickmann | 244/17.23 |
| 3,477,796 A | * | 11/1969 | Weiland | 416/204 R |
| 3,592,412 A | * | 7/1971 | Glatfelter | 244/7 A |
| 3,889,902 A | | 6/1975 | Madet | |
| 3,916,688 A | * | 11/1975 | Dendy et al. | 73/178 T |
| D292,194 S | | 10/1987 | Moller | |
| 4,757,962 A | * | 7/1988 | Grant | 244/12.3 |
| 4,955,560 A | | 9/1990 | Nishina et al. | |
| 5,000,398 A | | 3/1991 | Rashev | |
| 5,115,996 A | * | 5/1992 | Moller | 244/12.5 |
| 5,421,538 A | * | 6/1995 | Vassa | 244/12.2 |
| 5,691,898 A | * | 11/1997 | Rosenberg et al. | 700/85 |
| 6,086,016 A | * | 7/2000 | Meek | 244/17.11 |
| 6,179,247 B1 | | 1/2001 | Milde | |
| 6,254,032 B1 | | 7/2001 | Bucher | |
| 6,260,796 B1 | | 7/2001 | Klingensmith | |
| 6,293,491 B1 | * | 9/2001 | Wobben | 244/17.23 |
| 6,568,630 B2 | | 5/2003 | Yoeli | |
| 6,886,776 B2 | * | 5/2005 | Wagner et al. | 244/12.4 |
| 2005/0061910 A1 | | 3/2005 | Wobben | |

OTHER PUBLICATIONS

Pound, et.al., "Towards Dynamically-Favourable Quad-Rotor Aerial Robots", White Paper- 10 Pages, Australian National University, Canberra, Australia.

* cited by examiner

*Primary Examiner*—Timothy D Collins
*Assistant Examiner*—Philip J Bonzell
(74) *Attorney, Agent, or Firm*—Raj Abhyanker LLP

(57) ABSTRACT

A vertical takeoff and landing aircraft, using for vertical lift and lateral thrust a redundant plurality of essentially similar electrically-powered and electronically-controlled thrust units mounted in a mechanically static or fixed fashion relative to one another in a substantially horizontal plane. The thrust units are situated in this planar array in aerodynamically approximate pairs, such that a complete failure of a single thrust unit would not substantially compromise the ability of the aircraft to maintain flight.

2 Claims, 12 Drawing Sheets

VERTICAL TAKEOFF AND LANDING AIRCRAFT USING A REDUNDANT ARRAY OF INDEPENDENT ROTORS

CROSS REFERENCE TO RELATED APPLICATIONS

The present application is a continuation application of U.S. provisional patent application Ser. No. 60/644,098, filed Jan. 14, 2005, for VERTICAL TAKE OFF AND LANDING AIRCRAFT USING A REDUNDANT ARRAY OF INDEPENDENT ROTORS, by Bradley Ward Hughey, included by reference herein and for which benefit of the priority date is hereby claimed.

FIELD OF THE INVENTION

The present invention relates to aircraft and, more particularly, to multiple rotor helicopters.

BACKGROUND OF THE INVENTION

Vertical Take Off and Landing (VTOL) aircraft have proven to be very useful transportation devices. In fact there are certain tasks, such as rough terrain rescue, where no other vehicle can approach the utility of a VTOL aircraft. If we are ever to realize the goal of universal personal aviation, easy-to-operate and inexpensive VTOL aircraft must be available.

The most common VTOL aircraft today is the single main rotor helicopter, usually equipped with a horizontal axis (yaw) tail rotor to counteract the torque produced by the main rotor shaft. Igor Sikorsky is generally credited with having invented this classic common helicopter. The first practical example, the Sikorsky model VS300, first flew in May 1940. Of all the VTOL aircraft based on conventional aircraft technology, the Sikorsky-inspired single main rotor, single tail rotor, or "classic helicopter" configuration has been the most widely adopted.

However, there are several pronounced drawbacks to the classic helicopter that many inventors have attempted to mitigate.

Classic helicopters are much more difficult to operate as compared to conventional aircraft. They require continuous, non-intuitive adjustments of power, pitch, roll, and anti-torque yaw forces.

Classic helicopters require a high degree of mechanical complexity in their control systems. Large drive and control forces must be applied to a large main rotor and simultaneously to a smaller tail rotor. These forces must be continuously variable, resulting in a myriad of rods, gears, bearings, and connection points. This complexity increases cost, making classic helicopters significantly more expensive to manufacture than conventional fixed-wing aircraft.

The main rotor of a classic helicopter must be made with enough mass so that it continues to rotate after an engine failure, allowing the pilot enough time to establish a windmill-style "glide" so the helicopter can be landed safely.

This procedure is referred to as "autorotation", and is the only way a classic helicopter can survive an engine failure in flight. This high rotor mass (100 Kg or more per blade), coupled with the fact that lateral thrust is obtained from the main rotor by continuously varying the pitch of the rotor blades as they traverse the arc of rotation (cyclic pitch), means the control forces required are very high. This places considerable stresses on control linkages, which in turn, leads to high maintenance costs and failure potential. This high blade mass also represents a greater impact energy hazard to ground personnel and structures during takeoff and landing.

Classic helicopters have a high degree of minimum complexity. In other words, virtually every component represents a single point of failure. If any part of a classic helicopter fails, the helicopter stops flying. There is no fault tolerance. In order to insure a modicum of reliability, even the smallest part in a classic helicopter must be manufactured from the finest materials to exacting tolerances. Again, this makes classic helicopters very expensive to produce.

Classic helicopters place very high stresses on single parts, and there is no redundancy. For example, a single main rotor shaft carries the entire weight of the fuselage and payload. Because of this, critical parts tend to wear out relatively quickly. Highly trained personnel must perform complex tasks according to rigorous maintenance schedules to insure a reasonable degree of safety. This significantly increases the operating costs above that required for conventional aircraft In short, the trade offs for the immense utility of the classic helicopter have been high procurement and maintenance costs, coupled with a very high skill level demand upon the pilot.

Since the original Sikorsky flew, many attempts to improve upon the classic helicopter concept have been tried. Virtually all have failed, largely due to four main factors.

Many prior inventions attempt to mitigate high pilot skill requirements with higher drive unit mechanical complexity, leading to an increased failure probability and a higher cost.

Many prior inventions embody improper aerodynamic considerations, including rotor disk loading factors that are too high to be efficient or practical.

Prior inventions attempt to combine the utility of VTOL aircraft with the high forward speed attributes of fixed-wing aircraft, in the misguided assumption that the main drawback to the classic helicopter is a low forward speed capability. In the end, these manifestations of multiple articulating engine and/or lifting surfaces actually increase complexity and risk of catastrophic failure. Witness the fact that no tilt engine or tilt wing has ever achieved any commercial success except in esoteric military applications.

Some modest design variations on the classic helicopter configuration have enjoyed limited success, mainly due to elimination of the tail rotor component. Coaxial or "over under" main rotor designs have been employed to achieve a torque-effect cancellation (prior art Hiller 1944, Norris, U.S. Pat. No. 6,460,802, and others). VTOL aircraft employing multiple rotors predate Sikorsky, with quad rotors (prior art G. de Bothezat, 1922) or Side-by-side (Weir-Cierva, 1936; Madet, U.S. Pat. No. 3,889,902).

However, while some gains may have been made in reduction of piloting skill requirements, this came at the expense of multiplying the main rotor system complexity and associated costs.

Any single rotor or propeller VTOL aircraft must have some means of counteracting the torque produced by the mechanical twisting of the rotor shaft. This requires incorporating a lateral (yaw force-producing) thrusting means somewhere in the airframe. The now famous NOTAR (VanHorn, U.S. Pat. No. 4,948,068) system eliminates the classic helicopter tail rotor by deflecting some downwash from the single main rotor (combined with turbine exhaust gasses), but this configuration still requires a much more complex mechanical control system than a conventional fixed-wing aircraft. Virtually all other torque compensation systems require an additional thrusting power source directed laterally, increasing complexity and costs.

It is universally recognized that incorporating multiple, redundant power plants into an aircraft can improve reliability. While this does add complexity, it is more than compensated for by the added safety and reliability.

Witness the fact that virtually every commercial passenger aircraft is equipped with two or more engines. However, there have been scant few examples of multi-engine, multi-rotor helicopters in commercial use, and virtually none of those can remain in operation if one or more rotors fail.

An ideal solution to the problems associated with Classic Helicopters would to be VTOL aircraft with a redundant number of vertical thrusting propellers or rotors, each offsetting, dispersing, or canceling the torque of the other(s), while maintaining a simple, preferably non-mechanical, control system. This precludes the use of propeller or rotor "tilting" technology or elaborate pitch, length, or other rotor axis articulation means to accomplish the goal.

The avoidance of mechanical thrust vectoring means eliminating potential failure modes. For example, if a tilting drive unit failed to tilt properly, and at the appropriate time, a dangerously unstable flight condition would result.

What is needed is a multiple rotor VTOL aircraft with an electrical or "fly by wire" control system. Some inventors have recognized the promise afforded by the advent of modern power electronic control devices. There have been a few attempts to incorporate electrical control means to multi-rotor VTOL aircraft, but they have not been successful, mainly due to aerodynamic inefficiency. These newer electric power and/or control designs typically reflect a desire to have an aircraft with a "flying saucers" appearance, rather than addressing fundamental aerodynamic problems.

Milde, U.S. Pat. No. 6,179,247 and Bucher, U.S. Pat. No. 6,254,032 reveal attempts to utilize multiple engines and multiple rotors for VTOL aircraft, but neither seems to incorporate basic aerodynamic disk loading considerations. The aircraft weight versus thrust disk area ratio is simply too high for them to exhibit hover efficiencies anywhere close to a classic helicopter, if they could be made to fly at all. This high disk area loading is largely due to the fact that the fuselage is located in the rotor plane of rotation itself, subtracting from the available disk area.

This contrasts with a conventional Classic helicopter, where the main fuselage only minimally subtracts from the available rotor disk area and does so at the root of the rotor disk.

Wagner, et al. (USP Ap. 2003/0085319) depicts an attempt to mitigate these aerodynamic shortcomings of a multi-engine propeller VTOL by incorporating fixed wings. Still, when compared to the rotor disk area of the ubiquitous Classic helicopter, this craft could not operate in hover in an efficient or fault-tolerant manner. Also, the thrust units utilize a "tilt" feature that adds costly complexity, and represents an added hazardous point of failure.

The Wobben patent (U.S. Pat. No. 6,293,491) teaches multiple electric motors, but also uses fixed wings, as well as dissimilar thrusting and lifting rotors. This approach adds complexity and aerodynamic inefficiencies in another misguided attempt to combine fixed-wing aircraft attributes with standard helicopter maneuverability. It would seem unlikely that the practice of the Wobben patent could result in an efficient or cost-effective aircraft.

The Wobben approach also does not include any redundant pairing of thrust units to maintain a substantial aerodynamic consistency in the event of a thrust unit failure. It also does not use the multiple electric lifting thrust units for lateral thrusting, relying instead on standard horizontal thrusting in combination with regular aerodynamic control surfaces. This adds unnecessary complexity and cost.

OBJECT OF THE INVENTION

It is therefore an object of the invention to provide a vertical takeoff and landing aircraft that is comparatively inexpensive to manufacture and maintain.

It is another object of the invention to provide a VTOL aircraft with a control system that is highly suitable for solid-state electronic computer control.

It is another object of the invention to provide a VTOL aircraft that is easy to operate and maintain.

It is another object of the invention to provide a VTOL aircraft with a high degree thrust system redundancy, to insure safety and reliability.

SUMMARY OF THE INVENTION

In accordance with the present invention, there is provided a vertical takeoff and landing aircraft, using for vertical lift and lateral thrust a redundant plurality of essentially similar electrically-powered and individually electronically-controlled thrust units mounted in a mechanically static or fixed fashion relative to one another in a substantially horizontal plane. The thrust units are situated in this planar array in aerodynamically approximate pairs, such that a complete failure of a single thrust unit would not substantially compromise the ability of the aircraft to maintain flight.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DETAILED DESCRIPTION OF THE INVENTION

Figure 1:
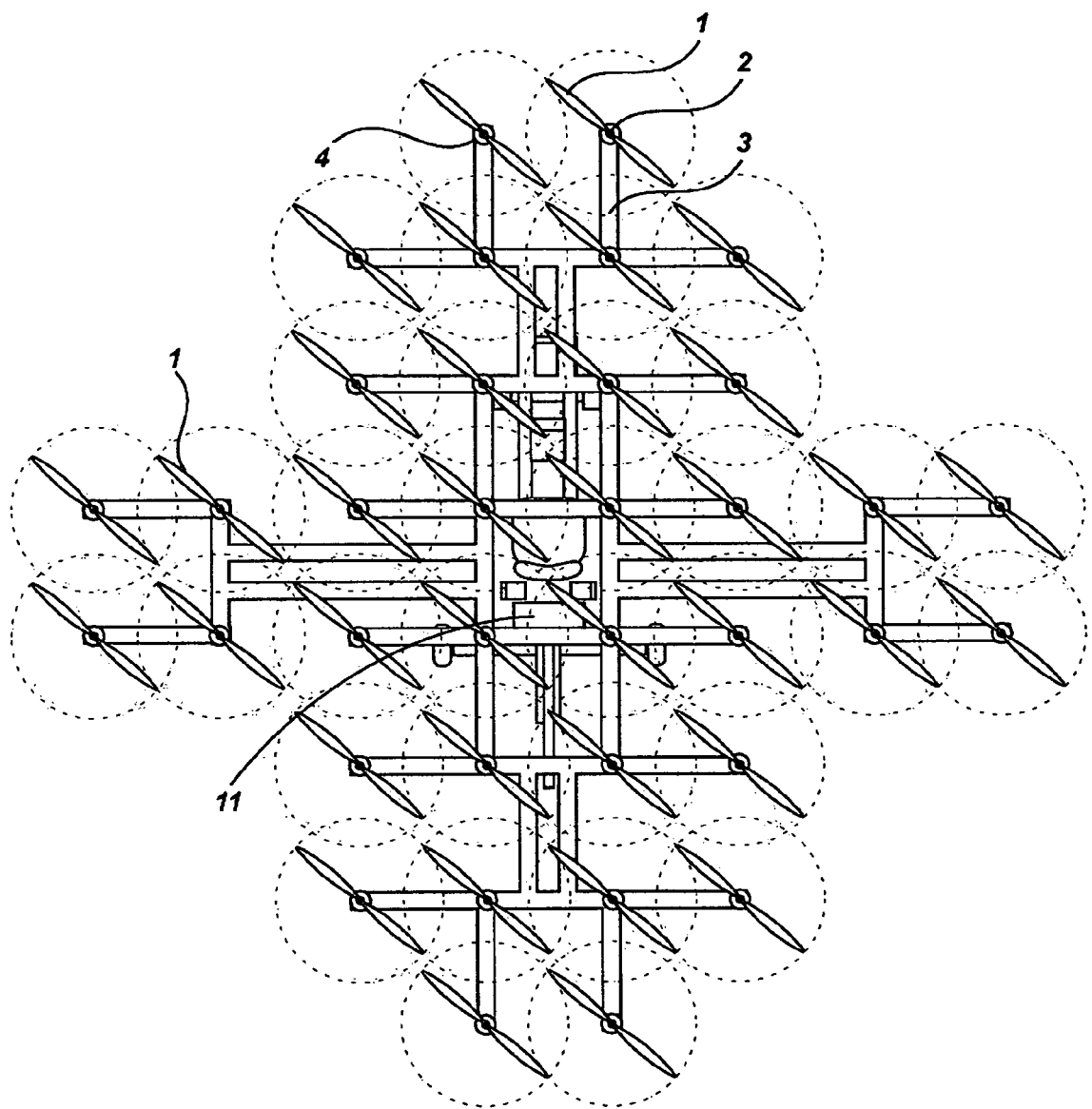
FIG. 1 is a top view of the current embodiment.
Figure 2:
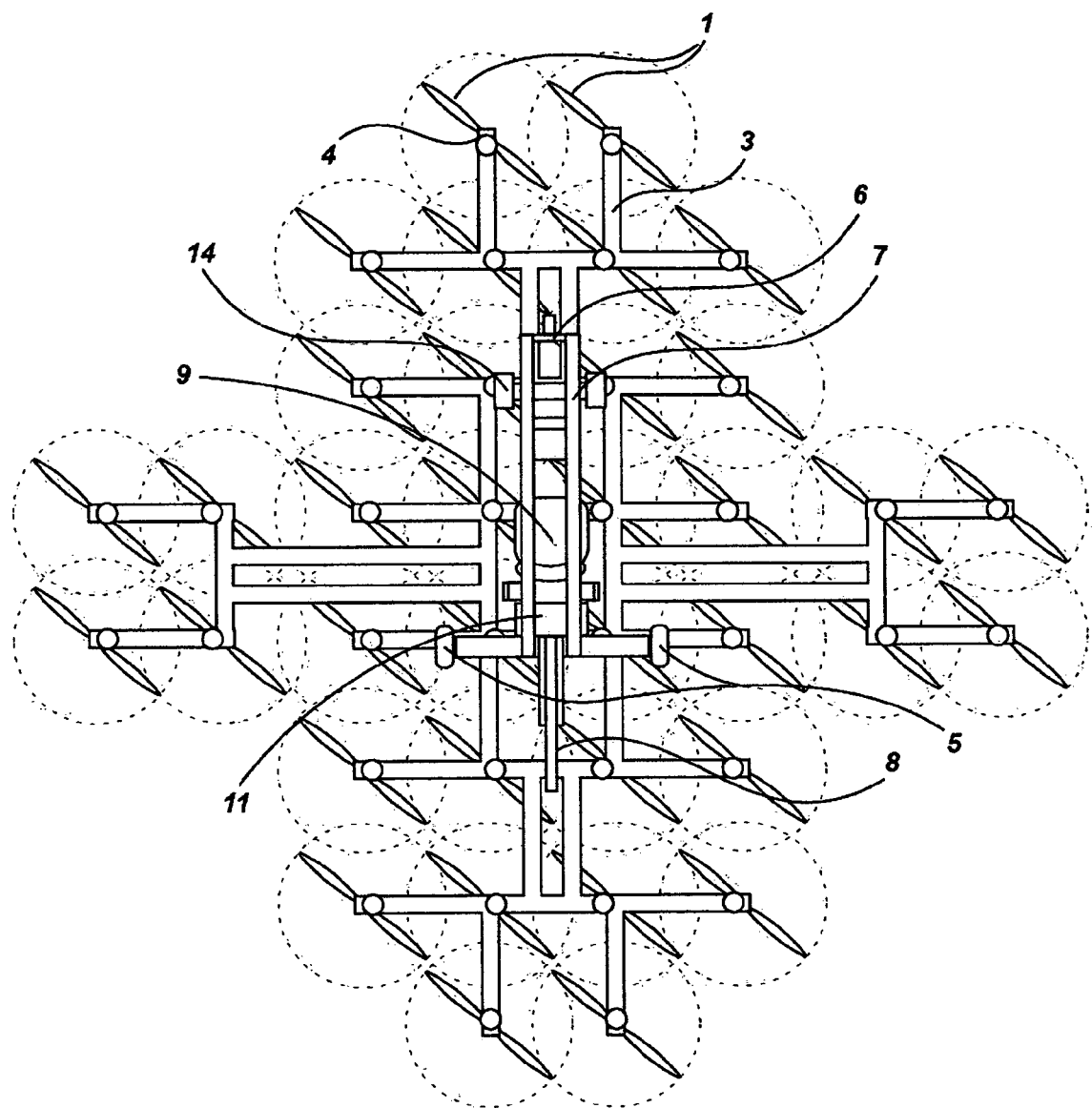
FIG. 2 is a bottom view of the current embodiment.
Figure 3:
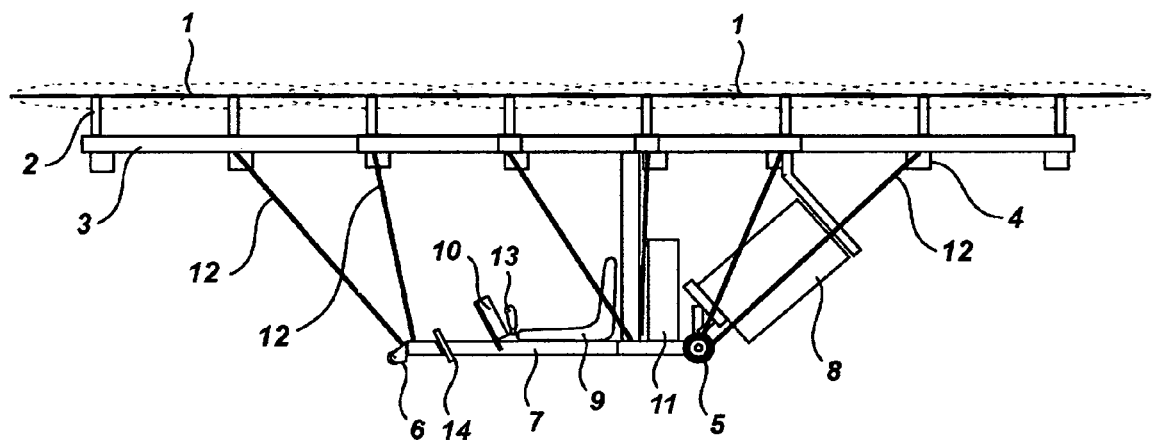
FIG. 3 is a left view of the current embodiment.
Figure 4:
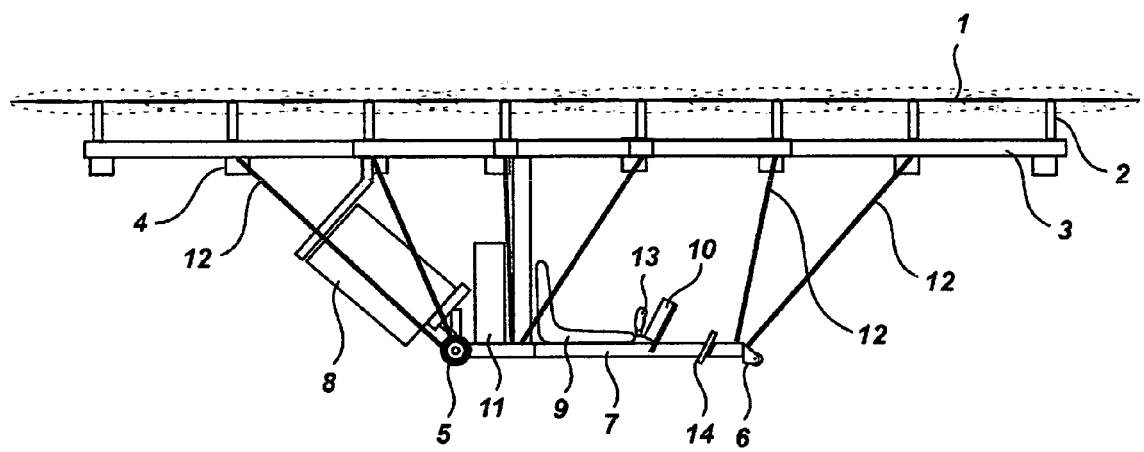
FIG. 4 is a right view of the current embodiment.
Figure 5:
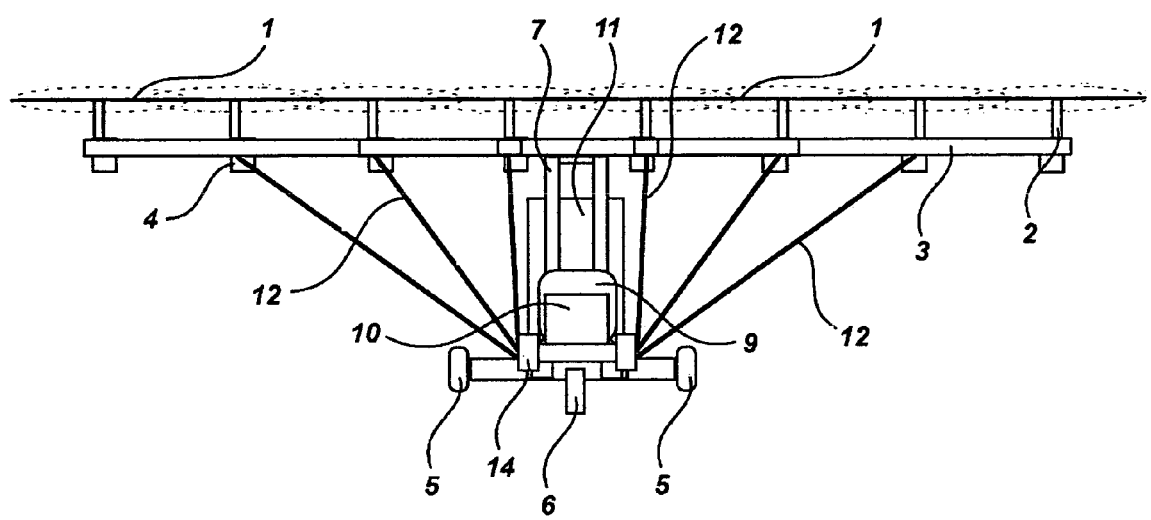
FIG. 5 is a front view of the current embodiment.
Figure 6:
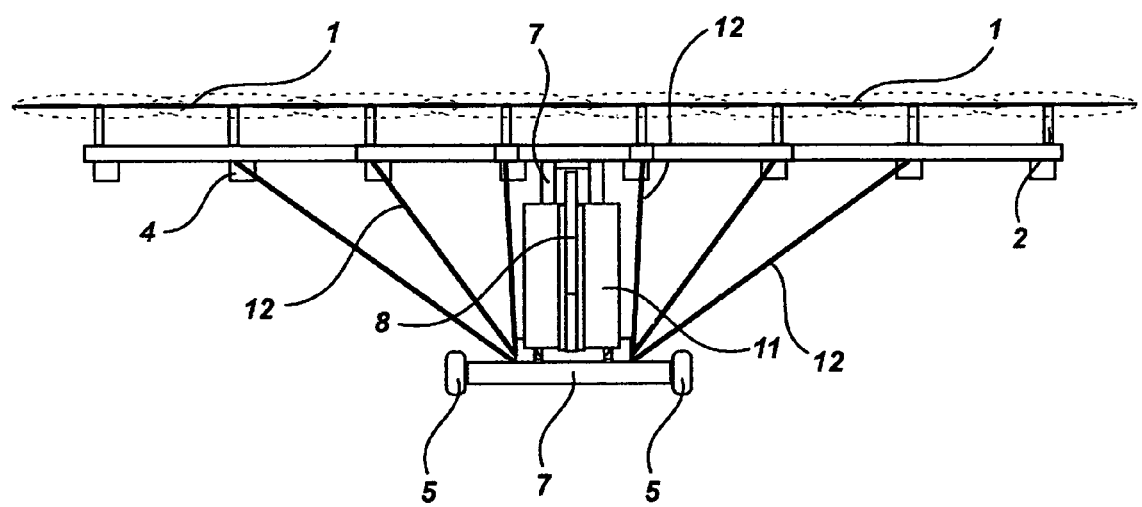
FIG. 6 is a rear view of the current embodiment.
Figure 7:
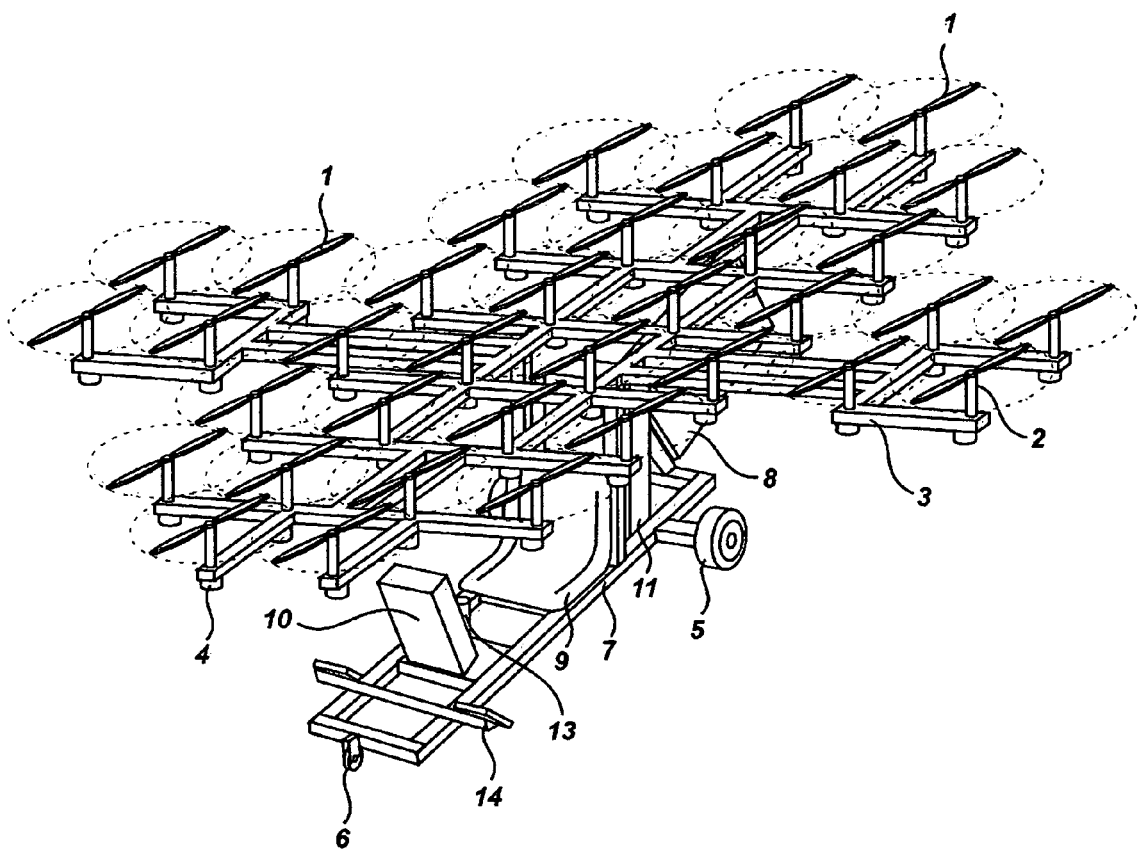
FIG. 7 is a front perspective view of the current embodiment.

Anyone skilled in the art would agree that unless cyclic pitch were employed in a fixed rotor helicopter, a minimum of three lifting rotors would be required to allow simultaneous pitch and roll control. These three rotors would need to be arranged in an approximate equilateral triangle, with the center of gravity of the aircraft in general proximity to the center of the triangle. However, in this minimum configuration, the lack of appropriate thrust from just one rotor during flight would cause a catastrophic failure of the aircraft.

Therefore, a minimal embodiment of the present invention would include three redundant pairs, or 6 total thrust units arranged so that the failure of one thrust unit in a pair would allow the aircraft to continue operation.

The current embodiment employs 36 separate drive units for the Redundant Array of Independent Rotors (hereinafter "RAIR"). Any embodiment would incorporate a minimum of 6 units as 3 dual pairs, with a preferred embodiment likely having 6 pairs or a total of 12.

A proper embodiment would dictate that the number and arrangement of propulsion units would allow for the failure of at least one of the units without causing a materially adverse effect on the continued operation of the aircraft.

The current RAIR grid embodiment is constructed of a framework (item #3 in all the drawings) of aluminum channel extrusion, as is much of the associated fuselage means and array attachment members. The grid is constructed so that the drive units (#4) are mounted in the corners of an approximately 36-inch square opening in the grid. A preferred embodiment would likely employ a framework made out of more exotic materials and fabrication techniques.

All the rotor blades (item #1 in the drawings) of the current embodiment are of a two-blade, standard rectangular plan form. It is obvious that the selection of an airfoil shape and pitch that performs well under static thrust conditions is important. Also, since auto-rotational characteristics are of no concern, greater emphasis is placed on lighter-weight construction, since this would tend to translate into more responsive control due to less rotational inertia.

The current embodiment RAIR grid provides a fairly uniform spacing of thrust units of approximately 36 inches, affording a rotor disk overlap (stagger) of 22%. The vertical gap spacing is approximately 10 inches, accomplished by using rotor shafts (item #2 in the drawings) of different lengths.

Overlapping rotor disks areas were chosen for the current embodiment due to the advantage of lighter, more efficient disk loading in a more compact rotor span. A preferred embodiment would likely incorporate this as well, or could use some manner of rotor disk shrouding to achieve a similar effect.

For ease of fabrication, the current embodiment is implemented with all the rotors turning in the same direction. This disperses the torque moments enough so that a null can be achieved through simple aerodynamic means. A preferred embodiment could also be implemented with half the rotors in the array turning in the opposite direction to positively cancel torque moments.

A preferred embodiment would likely employ rotor blades with both taper and twist, allowing for more uniform thrust loading and efficiency.

The reliability afforded by RAIR technology would allow the rotor blades to be fabricated of common "model airplane" quality materials, such as reinforced plastic. Using a lighter-weight composite material for the blades would have the added advantage of lower rotational inertia, affording a more rapid change in thrust unit output, resulting in a more rapid RAIR response to control input.

Standard brush-type electric motors (#19) were chosen for the current embodiment thrust units. An 11.3:1 reduction gear assembly, consisting of a motor gear (#18), an output gear (#15), and an intermediate shaft (#16) with intermediate reduction gears (#17) is used to drive the rotor shaft to approximately 1500 RPM at full throttle. A preferred embodiment would likely utilize purpose-built "brush-less DC" or inductive AC motors matched in efficiency for the intended rotor operational RPM range.

Figure 12:
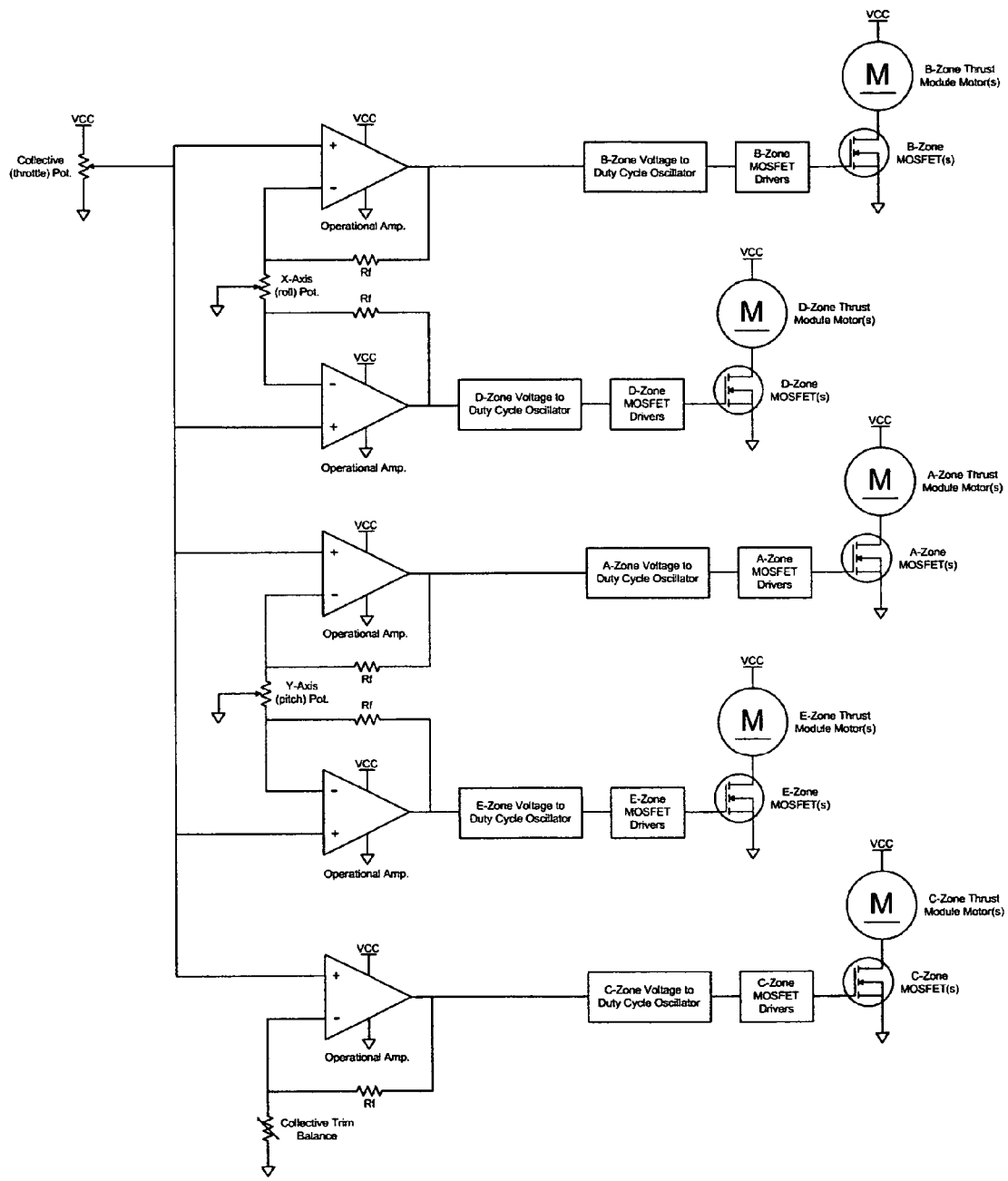
FIG. 12 is a plan view of an electrical block diagram of the current embodiment power distribution and control system.

A representative electrical schematic diagram for the current embodiment RAIR control system is depicted in FIG. 12.

Aggregate RAIR thrust vector control, including pitch, roll, and lift, are implemented through individual DC motor speed controls for each thrust unit. The current embodiment uses MOSFET devices in a "low-side" duty-cycle controller circuit.

By varying the pulse width to each MOSFET gate, the effective voltage applied to the motor is raised or lowered. In the current embodiment, the main analog computer module controller (#10) has a voltage meter (as a metaphorical "fuel gauge") and individual switches for each thrust unit motor relay. The joystick control (#13) is naturally situated between the computer module and the pilot's seat (#9).

The duty cycle controller used in the current embodiment employs 5 standard dual 555 timer chips, each configured as a ramp generator/integrator. These five circuits produce a square wave with a duty cycle that is proportional to a DC voltage input. The number of discrete duty cycle controllers was chosen for the current embodiment because that is the minimum number of thrust control "zones" required for RAIR operation.

A referred embodiment might include an individual control zone for each thrust unit, I.E. 36 different duty cycle possibilities for 36 thrust units, or 12 for 12, etc.

The control zones for the current embodiment are arranged so that zone A is the front zone, zone B is the left, zone C is the center, zone D is the right, and E is the rear.

Therefore, pitch control is achieved by varying the duty cycles of zones A and E inversely to one another. Zone A includes the 6 thrust units at the front of the aircraft, while zone E is its counterpart at the rear. Zones B and D include the 4 thrusting units at the far left and right, respectively, and are inversely varied in duty cycle for roll control. Zone C is used for vertical lift only, and the speed of the thrust units in this zone are increased or decreased to implement a "collective" control function.

A common consumer-grade analog joystick with three potentiometers (x-axis, y-axis, and throttle) was chosen for the current embodiment to provide variable voltage inputs to the duty cycle controller. In the circuit topology between these pots and the 556 timer chips are standard analog operational amplifiers configured in differential mode.

When the "throttle" pot is moved, all the thrust units in the array, regardless of zone, are increased or decreased. Movement of the x and y axis pots do not affect zone C in the current embodiment, but may in a preferred embodiment. The output of the duty cycle circuit is connected to the inputs of an appropriate number of MOSFET "low side" driver chips. The output of these chips drive the MOSFET gates.

A preferred embodiment could use any manner of control movement encoding means, including but not limited to rotary optical encoders, and would likely include one or more microprocessors for duty cycle control. This way, any number of input variables could be considered in the creation of the duty cycle waveform. For instance, the aggregate thrust vector direction could be automated to keep the RAIR level. With silicon accelerometers mounted in the array, means to keep the pilot from over-controlling the aircraft could be employed. An autopilot system could be linked to a GPS with altimeter to automatically keep the aircraft out of controlled airspace, etc. The possibilities for automatic RAIR control are virtually boundless.

While it would increase control system complexity somewhat, a preferred embodiment could also include a means to effect in-flight changes in rotor blade pitch. This would provide for increased efficiency of the RAIR with larger magnitudes of forward velocity.

On-board electric power for the current embodiment comes from an array of nickel-metal hydride "sub-C" size 1.2 volt, 3300 mA/H cells. These are arranged into 36 packs of 20 cells each, for a total of 720 cells in the battery module (#11), along with positive disconnection relay switches for each thrust module. The NiMH cells were chosen because of their high discharge current capability and relatively low weight. This gives the current embodiment (proof-of-concept) RAIR prototype approximately 5 minutes of out-of-ground-effect hover time.

Lithium Ion Polymer battery technology is also very promising, with a higher energy capacity per unit mass, albeit with higher procurement costs. A preferred embodiment would likely utilize a gasoline-powered motor-generator device for much higher energy density, affording more practical flight times.

More modern fuel-cell technology could also be employed. Such an embodiment could still use secondary batteries for backup in the event that the motor/generator failed (not unlike an uninterruptible power supply for a computer system).

Yaw control in the current embodiment is accomplished through the use of a standard "full flying" rudder (#8), placed at approximately a 45-degree angle to, and below, the longitudinal axis of the RAIR. The rudder is attached via flexible cables to a rudder pedal bar (#14) directly in front of the pilot's position.

There are many options for yaw control in a preferred RAIR embodiment. Considering the advantages of microprocessor control, any yaw means that could be controlled electronically would be most worthy of consideration. For example, a standard rudder with servo control could be used. Two (preferably four) or more of the thrust units in the RAIR array itself could be mounted at a slight angle from horizontal and a separate zone created for them. Even a "standard-looking" electric-motor powered tail rotor could be implemented with relatively low complexity and cost.

Figure 8:
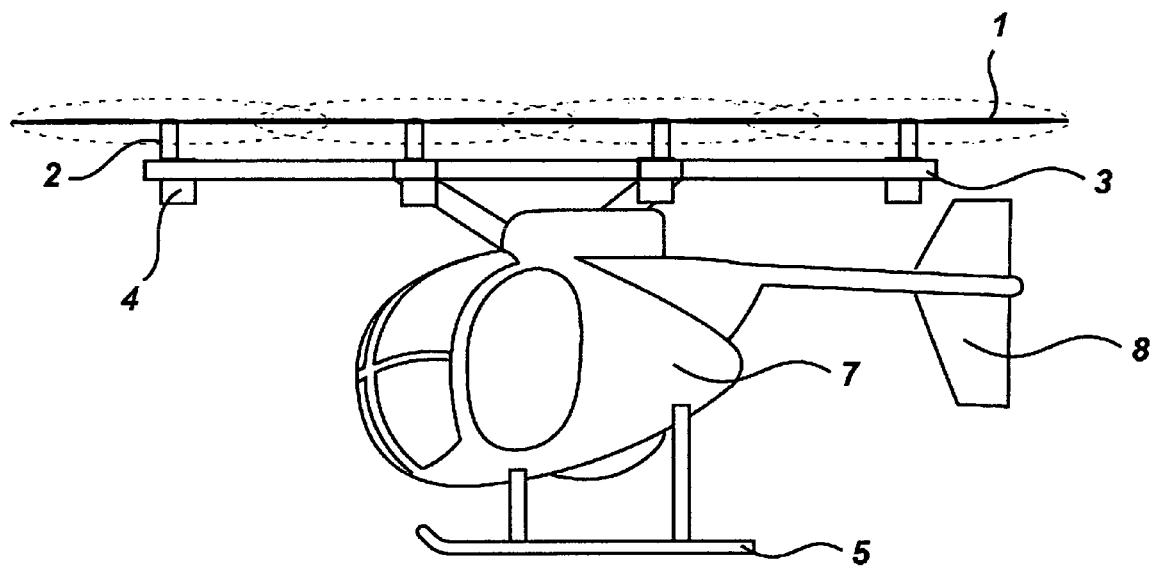
FIG. 8 is a left view of a preferred embodiment.
Figure 9:
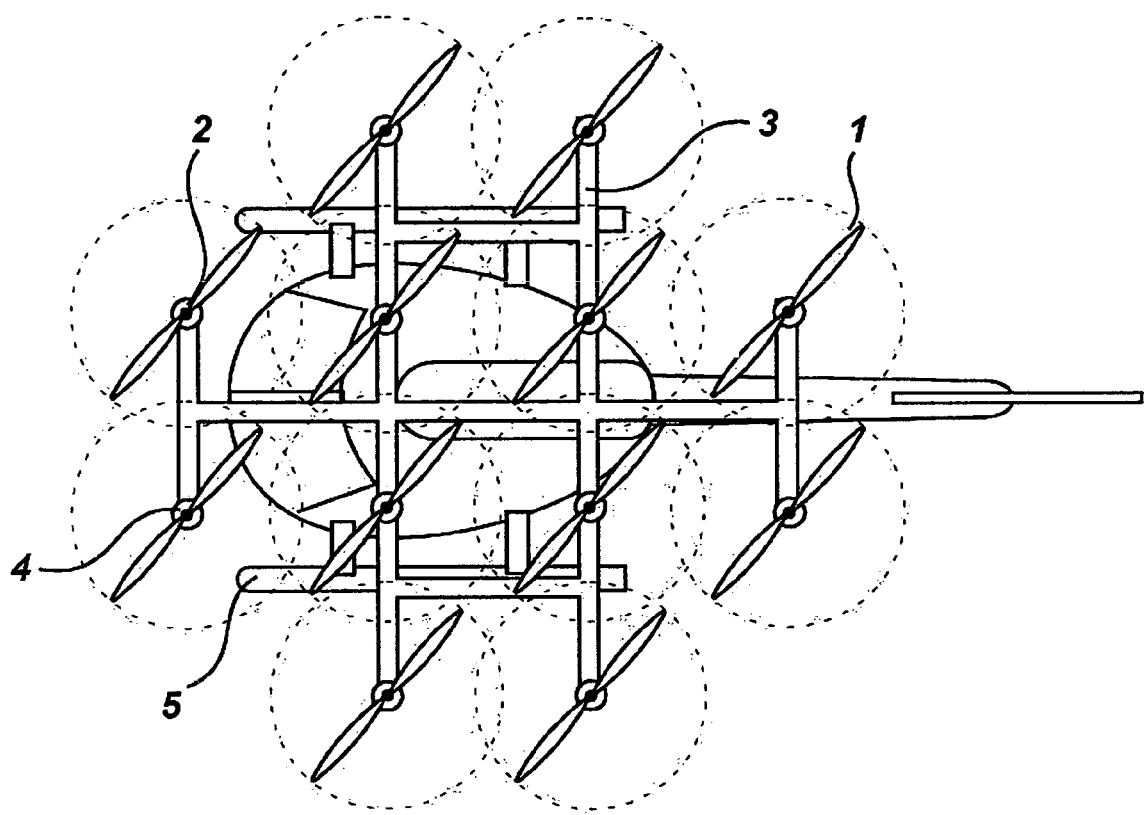
FIG. 9 is a top view of a preferred embodiment.
Figure 10:
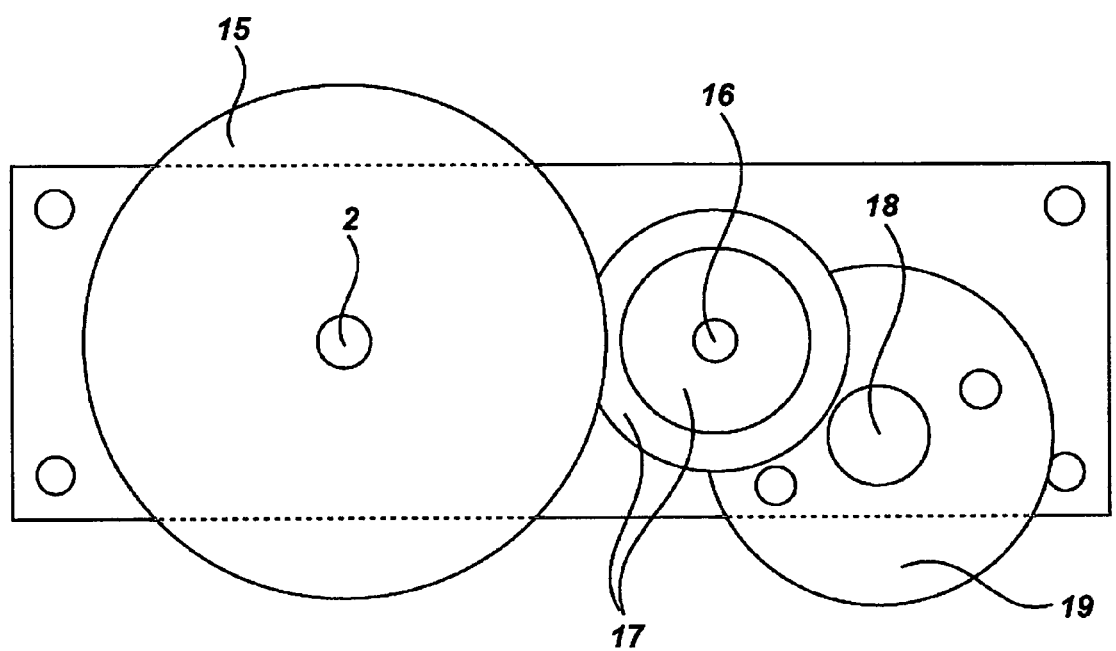
FIG. 10 is a top detail view of the current embodiment thrust drive unit.
Figure 11:
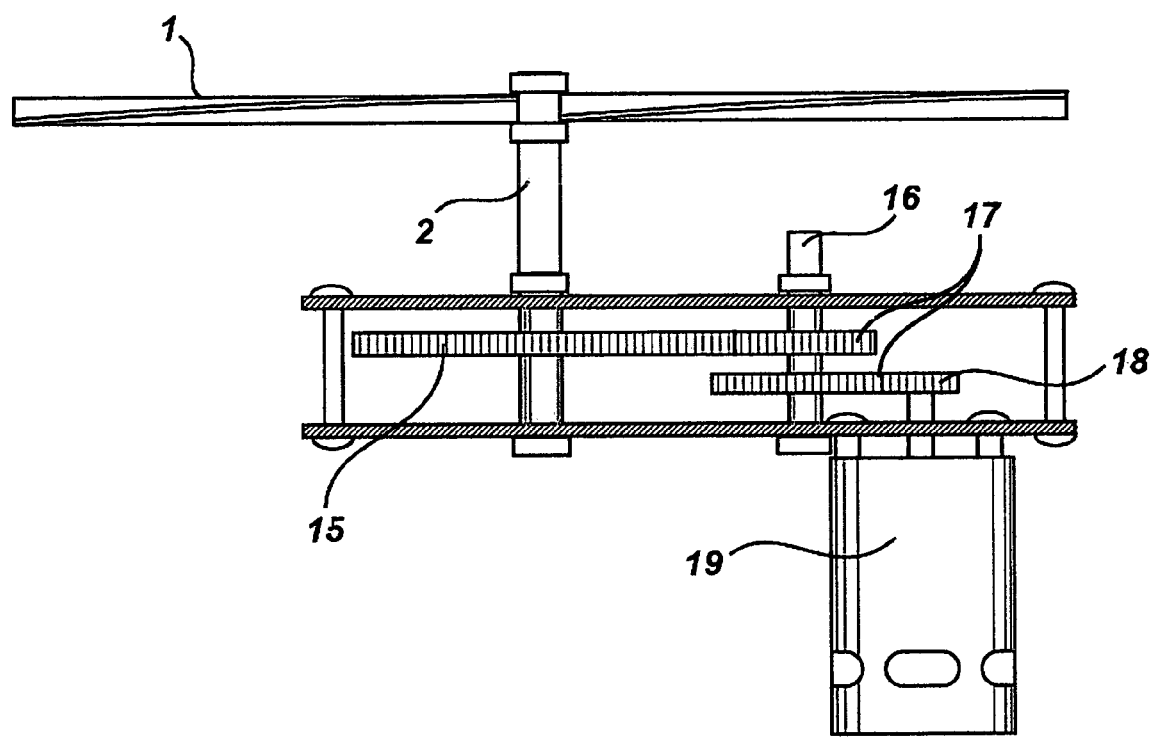
FIG. 11 is a left detail view of a current embodiment thrust drive unit.

The remainder of the RAIR current embodiment construction includes fuselage members (#7), which provide a framework for attachment and proper orientation of the essential components of the present invention. The fuselage also incorporates two main landing gear wheels (#5), a nose wheel (#6), and bracing cables (#12) where appropriate. A preferred embodiment might, in fact, look very similar to a classic helicopter fuselage with a simple rudder, as depicted in FIGS. 8 and 9.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What I claim is:

1. A vertical take off and landing aircraft comprising:
   at least six substantially similar independent electrically powered thrusting units formed from a Redundant Array of Independent Rotors (RAIR) that includes at least thirty six separate drive units, whereby the at least six substantially similar independent electrically powered thrust units are mounted to the vertical take off and landing aircraft in aerodynamically approximate pairs to avoid a flight compromise when at least one of the pair of independent electrically powered thrusting units fails to operate, wherein the independent electrically powered thrusting units incorporate rotational air movement means having an aggregate aerodynamic disk area to total aircraft mass ratio substantially similar to a standard single-rotor helicopter;
   a two blade structure with pre-determined taper, twist, and a standard rectangular plan form for each of the rotors of the RAIR for providing uniform thrust loading and efficiency, wherein the blade structure for the rotors of the RAIR are attached to each of the rotors of the RAIR using a fixed pitch that limits a rotor mechanical complexity and a chance of failure;
   a grid structure that is so constructed to provide fixed positions for each of the rotors of the RAIR relative to one another and spaced apart in an approximate geometric plane with a common thrust vector direction substantially perpendicular to the approximate geometric plane, wherein the grid structure to provide a fairly uniform spacing of thrust units of approximately 36 inches, thereby providing a rotor disk area overlap of approximately 22%;
   a control system to provide an aggregate RAIR thrust vector control to the vertical take off and landing aircraft by controlling a plurality of control zones of the RAIR by implementing a Direct Current (DC) motor speed control for controlling pitch, roll and lift for each of the independent electrically powered thrust unit associated to the plurality of the control zones;
   an analog computer module controller to include a voltage meter and individual switches for powering each thrust unit motor relay of the RAIR;
   a thrust magnitude control means for the RAIR, whereby the individual and collective magnitude of thrust from each of the independent electrically powered thrusting units associated to the particular control zones can be altered during operation of the vertical take off and landing aircraft to provide a pitch and roll functionality substantially similar to a standard helicopter single rotor disk, and wherein the thrust magnitude control means incorporates an analog or digital computer means;
   a rudder placed appropriately in a mechanical position at approximately a 45-degree angle to, and below, the geometric plane of the RAIR to provide yaw control;
   means of attaching a payload carrying means whereby a center of mass of the payload carrying means is substantially near the center of, and in a fixed mechanical position relative to the approximate geometric plane;
   a control joystick situated between the analog computer module and a seat of a pilot to enable control of the thrust units to provide vertical take off, landing and direction to the vertical take off and landing aircraft;
   a Global Positioning System (GPS) communicatively coupled to an altimeter of the vertical take off and landing aircraft to provide an autopilot system to automatically keep the vertical take off and landing aircraft out of controlled airspace;
   a battery module to power the RAIR through the control system; and
   a backup power module to power the RAIR in case of failure of the battery module.

2. The vertical take off and landing aircraft of claim 1, wherein the plurality of the control zones is comprised of a front zone that includes six rotors that are placed upfront in the geometric plane of the grid structure towards a direction that the pilot is facing in the vertical take off and landing aircraft, a left zone that includes four rotors that are placed on the left side of the geometric plane of the grid structure towards a direction that is on the left side that the pilot is facing in the vertical take off and landing aircraft and the right zone that includes four rotors that are placed on the fight side of the geometric plane of the grid structure towards a direction that is on the right side that the is pilot facing in the vertical take off and landing aircraft, a rear zone that includes six rotors that are placed in the rear of the geometric plane of the grid structure towards an opposite direction that the pilot is facing in the vertical take off and landing aircraft, and a central zone that includes the remaining sixteen rotors that are placed in the central part of the geometric plane of the grid structure surrounded by the front, left, fight and the rear zones, wherein the front zone and the rear zones are used for pitch control of the vertical take off and landing aircraft, wherein the left zone and the fight zones are used for roll control of the vertical take off and landing aircraft, and wherein the central zone is used for vertical lift of the vertical take off and landing aircraft, wherein the rudder is attached to a rudder pedal bar in front of a pilot's position using plurality of flexible cables, wherein the blades of the rotors of the RAIR are comprised of a reinforced plastic, wherein the reinforced plastic is comprised of a material below a threshold density that limits a rotational inertia of the rotor blade, increases response rate of the independent electric powered thrusting units, reducing a material cost, wherein each of the plurality of the independent electric powered thrusting units associated to the control zone are controlled using a duty cycle waveform provided for each of the control zone, wherein the duty cycle waveform for the plurality of the independent electric powered thrusting units associated to the control zone is adjusted using the control joystick, wherein the duty cycle waveform for the plurality of the independent electric powered thrusting units associated to the control zone is controlled using a microprocessor via the control zones, and wherein the duty cycle waveform of the plurality of the independent electric powered thrusting units associated to the control zone are controlled to keep a pilot from over-controlling the vertical take off and landing aircraft, wherein the duty cycle waveform of the plurality of the independent electric powered thrusting units associated to the control zone at an autopilot mode is controlled using the GPS coupled to the altimeter via the microprocessor to keep the vertical take off and landing aircraft from traveling into a restricted airspace.

* * * * *